2,745,811

BLUE ELECTROLUMINESCENT ZINC SULFIDE PHOSPHOR

Keith H. Butler, Marblehead, and Horace H. Homer, Arlington, Mass., assignors to Sylvania Electric Products, Inc., Salem, Mass., a corporation of Massachusetts No Drawing. Application June 8, 1951, Serial No. 230,712

3 Claims. (Cl. 252—301.6)

This invention relates to electroluminescent phosphors, that is, to phosphors which luminesce when placed in a dielectric medium and excited by an electric field.

Blue-luminescing phosphors of this type with high brightness under low frequency excitation have been difficult to obtain, although phosphors luminescing green under such excitation have been previously known. The latter have been generally of the zinc sulfide type, activated by copper and containing small amounts of chloride.

We find that a phosphor with good blue luminescence can be produced by the use of lead and copper in combination, both being held within the limits of a critical range, provided that there is substantially complete elimination of the chloride. The brightness of the resultant phosphor is greatly increased if it is made by double firing, that is by firing the mixture of starting materials once, then thoroughly remixing the materials and firing again. Zinc oxide may be used as one of the starting ingredients but its use is not essential and we prefer to use either no zinc oxide or just a small amount of it.

In one embodiment of the invention, we prepare the zinc sulfide raw material by precipitation with hydrogen sulfide from a zinc sulfate solution, the latter being substantially free from chloride as well as being free from all metallic impurities. To each 0.9 mole of this, about 0.1 mole of pigment grade zinc oxide is added, and also about 0.0005 mole of reagent grade lead carbonate and about 0.0005 mole of reagent grade cupric oxide. These materials are mixed dry in a tumbling barrel and then further mixed by hammermilling. The resultant mixture is fired in silica boats passed continuously through a larger silica tube heated at its middle to about 1720° F., with a stream of nitrogen or other comparatively inert gas flowing through the tube in the direction opposite to that of the travel of the boats. The method can be, for example, that described in our copending application filed concurrently herewith.

Although the final phosphor is fired, the zinc sulfide used as a raw material may be of either the fired or unfired type. Zinc carbonate or hydroxide may be used in place of zinc oxide, and other lead salts than the carbonate, for example the oxide or sulfate can be used. Copper sulfide, cuprous oxide or other copper salts may replace the cupric oxide. Halide salts should be avoided in the raw materials, because the phosphor must be substantially free from halides to give blue electroluminescence. The lead salt used is preferably something other than the sulfide, because free lead sulfide in the final phosphor is undesirable, since it tends to increase the conductivity.

After firing, the phosphor is treated with a reagent capable of dissolving zinc oxide without dissolving zinc sulfide appreciably, such as an aqueous solution of saturated ammonium acetate or of hot dilute acetic acid, preferably the latter. This treatment lightens the color of the phosphor, increases the brightness of the luminescence and reduces the conductivity of the phosphor. The effect on conductivity is particularly noticeable when zinc oxide is used in the starting mixture. However, the treatment is beneficial even if no zinc oxide is specifically added, because there appears to be some oxidation during the firing, even in the presence of the inert gas atmosphere used.

Table I shows the effect of copper concentration on phosphors made with 0.70 mole of ZnS and 0.30 mole of ZnO. It is apparent that the copper content must be above .0004 mole to get appreciable light output but that the current is then high. Reduction of the lead from .005 to .0005 gives a marked reduction in current but the light output remains low unless the copper is increased to .001 mole. Reduction of the amount of zinc oxide, or even its elimination, gives a brighter phosphor with a somewhat lower current.

These effects have been confirmed by other tests and it has been established that the zinc oxide content should be below 10 mole percent for best results. With this zinc oxide content, the lead should lie between .0002 and .0015. The behaviour is particularly sensitive to copper concentration since high copper gives dark powders of high conductivity. The optimum concentration appears to lie between .0004 and .0008 mole.

In the case of lead, there is a considerable loss during firing, and the amount of lead present in the final mixture is only of the order of 0.001% by weight, that is between 0.01% and 0.0001%.

*Table I*

| Moles in Mixture | | | | Test on Treated Powder | |
|---|---|---|---|---|---|
| ZnS | ZnO | PbCO$_3$ | CuO | Light | Current |
| 0.70 | 0.30 | 0.0050 | 0.0001 | 1 | 120 |
| 0.70 | 0.30 | .0050 | .0002 | 12 | -------- |
| 0.70 | 0.30 | .0050 | .0004 | 23 | 1,150 |
| 0.70 | 0.30 | .0005 | .0004 | 13 | 330 |
| 0.70 | 0.30 | .0005 | .0010 | 125 | 2,700 |
| 1.00 | None | .0005 | .0016 | 195 | 1,000 |

Table II below demonstrated the effect of double firing on two samples, one made with high lead and copper and the second made with our preferred amounts. The phosphors made with a single firing were non-homogeneous with dark areas being present in the powder. On mortar grinding and refiring the powder became homogeneous and gave a much higher light output.

*Table II*

| Run No. | Moles in Mixture | | | | Test on Treated Powder | |
|---|---|---|---|---|---|---|
| | ZnS | ZnO | PbCO$_3$ | CuO | Light | Current |
| A | 0.90 | 0.10 | 0.0010 | 0.0013 | (¹) | (¹) |
| B | 0.90 | 0.10 | .0005 | .0005 | 73 | 210 |
| Refired A | 0.90 | 0.10 | .0010 | .0013 | 490 | 710 |
| Refired B | 0.90 | 0.10 | .0005 | .0005 | 460 | 400 |

¹ Excessive current.

Table III below demonstrates clearly that the presence of a small amount of lead is essential for obtaining good fluorescence and shows also the critical nature of the allowable range of copper and lead content in their effect on light output and current.

*Table III*

| Sample | Moles in Mixture | | | | Test on Treated Powder | |
|---|---|---|---|---|---|---|
| | ZnS | ZnO | PbCO₃ | CuO | Light | Current |
| A | 0.90 | 0.10 | none | .0005 | 3 | 130 |
| B | 0.90 | 0.10 | .0002 | .0005 | 140 | 170 |
| C | 0.90 | 0.10 | .0005 | .0005 | 460 | 400 |
| D | 0.95 | 0.05 | .0002 | .0005 | 220 | 160 |
| E | 0.95 | 0.05 | .0002 | .0008 | 620 | 260 |

While light output improves with increasing lead, the conductivity becomes undesirably high with lead contents above 0.0010 mole per mole of ZnS. Table IV below shows that the use of zinc oxide is not essential but that its use may improve the light output somewhat.

*Table IV*

| Sample | Moles in Mixture | | | | Test on Treated Powder | |
|---|---|---|---|---|---|---|
| | ZnS | ZnO | PbCO₃ | CuO | Light | Current |
| A | 1.00 | None | .0005 | .0005 | 290 | 170 |
| B | 0.95 | 0.05 | .0005 | .0005 | 330 | 180 |
| C | 0.90 | 0.10 | .0005 | .0005 | 360 | 170 |

In obtaining the light output and electrical current data in the above tables, the phosphor powder was dispersed in castor oil and the resultant suspension placed between a metal plate and a piece of electrically-conductive glass, spaced apart 0.010 inch to form a film of the suspension therebetween. The effective area of the cell formed is about five square inches. A voltage from a 500 volt, 60 cycles per second alternating current source was applied between the conductive glass and the metal plate. The light output was then measured with a photocell, and the current with a microammeter.

The spectral energy distribution of this new phosphor is extremely broad, extending through the whole visible spectrum. This property makes the phosphor especially well suited for blends with the yellow electroluminescent phosphor described in an application of Keith H. Butler, filed June 8, 1951, the combination giving a white light.

In addition to the washes described above for removing the zinc oxide without removing the sulfide, other agents may be used for that purpose as shown for example in the co-pending application Serial No. 180,783, filed August 22, 1950, by Elmer F. Payne.

The phosphor described herein has proven very effective when immersed in a solid dielectric material such as nitrocellulose, waxes, and plastics of high resistivity, dielectric constant and dielectric strength, and then excited by a varying or alternating voltage, as in the electroluminescent lamp described in the above-mentioned application of Elmer F. Payne, or in an application filed June 8, 1951, by Erwin F. Lowry, Eric L. Mager and Keith H. Butler.

What we claim is:

1. A blue-electroluminescing phosphor of low conductivity, consisting essentially of chloride-free zinc sulphide activated by between about 0.0002 and about 0.0015 mole of copper per mole of zinc sulphide and containing between about 0.01% and 0.0001% lead by weight.

2. A blue-electroluminescing phosphor of low conductivity, consisting essentially of chloride-free zinc sulphide activated by between about 0.0002 and about 0.0015 mole of copper per mole of zinc sulphide and containing about 0.001% of lead by weight.

3. The method of making a blue-emitting electroluminescent phosphor, comprising mixing chloride-free zinc sulfide with between about 0.0002 and about 0.0015 mole of a copper activating compound per mole of zinc sulphide and with a sufficient quantity of a lead activating compound to leave between about 0.01% and 0.0001% by weight of lead in the phosphor after firing the resultant mixture at high temperature, thoroughly mixing the ingredients after said firing, then refiring, and then treating with a wash capable of dissolving zinc oxide without dissolving zinc sulfide.

References Cited in the file of this patent

UNITED STATES PATENTS

| 1,944,281 | Stephens | Jan. 23, 1934 |
| 2,447,322 | Fonda | Aug. 17, 1948 |

OTHER REFERENCES

Destriau: Article in Phil. Mag. 38, 1947, pp. 706–710. (Copy in Scientific Library.)

Leverenz: Luminescence of Solids, 1950, page 308.